Aug. 17, 1937.  F. A. HOPPE  2,090,204
OVEN FOR BAKERIES
Filed Nov. 9, 1935   2 Sheets-Sheet 1
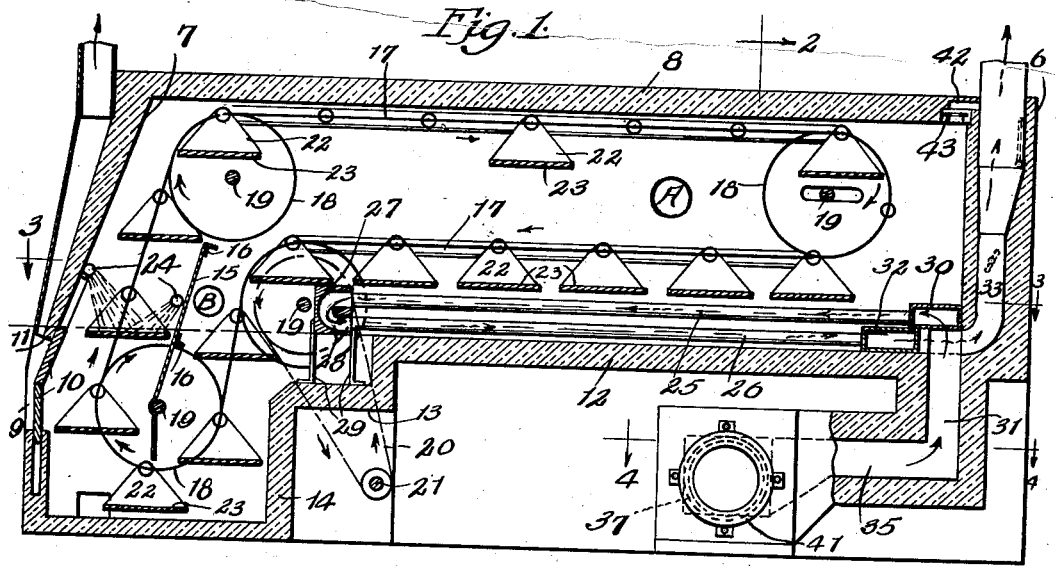
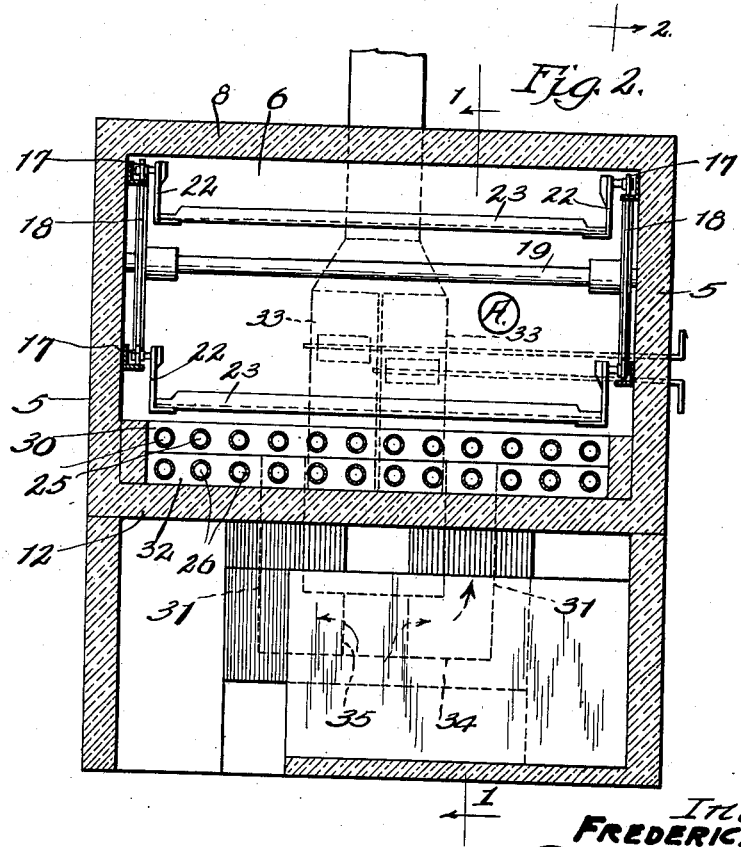
Inventor
FREDERIC A. HOPPE

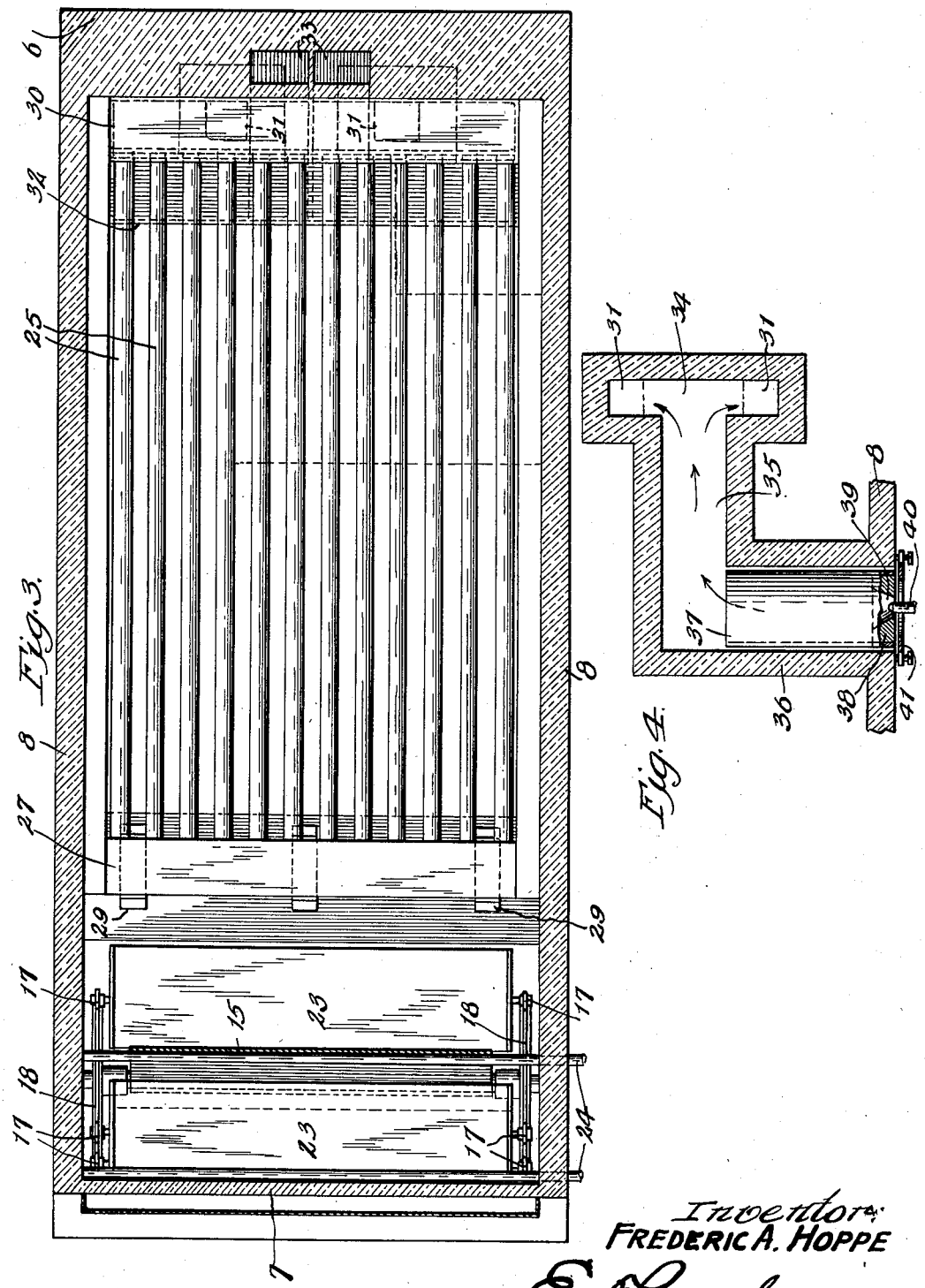

Patented Aug. 17, 1937

2,090,204

UNITED STATES PATENT OFFICE 2,090,204

OVEN FOR BAKERIES

Frederic A. Hoppe, Chicago, Ill., assignor to Fish Rotary Oven Co., Beloit, Wis., a corporation of Wisconsin Application November 9, 1935, Serial No. 49,043

2 Claims. (Cl. 107—57)

My invention relates to ovens for commercial bakeries, and more particularly to an oven of the continuous type in which an endless carrier conveys the articles being baked in a circuitous path through the baking compartment.

One of the numerous objects of my invention is provided in a novel baking chamber within an oven that is substantially air-tight and steam-tight, the shape of said chamber being such that the major portion thereof is above the horizontal plane of the lintel or top edge of the access opening at the front of the apparatus. Another of these objects is to provide heating elements for the oven chamber that are arranged in a novel manner in superposed tiers, the one above the other, so that the upper tier, which is the hottest, is closest to the carrier trays. All of these heating units are above the horizontal plane of the lintel or top edge of the access or loading opening at the front of the structure. Also I have provided the oven chamber with means for spraying low-pressure steam upon the goods immediately after they have been loaded on the traveling trays and are entering the baking chamber proper.

Further objects are to provide a bakery oven which performs its functions more effectively than other ovens of a competitive character; that is novel in construction; that is compact in the arrangement of its parts; and is economical to manufacture so that it may be sold for a reasonable retail price.

Additional objects and advantages of my invention will be apparent to persons skilled in the art after the construction and operation thereof is understood from the following detailed disclosure. I prefer to accomplish these numerous objects, and to practice my invention, in substantially the manner hereinafter fully described and as more particularly pointed out in the appended claims, reference being herein made to the accompanying drawings that form a part of this specification:

In the drawings:

Figure 1 is a longitudinal vertical section of a bakery oven made in accordance with my invention, the section being on line 1—1 of Figure 2 and looking in the direction of the arrows.

Figure 2 is a transverse vertical section of the structure shown in Figure 1 and taken on line 2—2 thereon and looking towards the rear of the oven.

Figure 3 is a horizontal section taken on line 3—3 of Figure 1 showing a plan of the baking chamber, Figure 4 is a view showing details of the heater, portions of the view being in section.

The drawings are to be understood as being more or less schematic for the purpose of illustrating a typical or preferred form in which my invention may be made, and in said drawings like reference characters are used to identify the same parts wherever these parts appear in the different views.

The oven structure preferably consists of vertical side walls 5, rear or back wall 6, front wall 7, and top wall 8, all of said walls being substantially rectangular in outline and formed from any suitable heat-insulating material. The lower portion of the front wall, approximately one-third its height, is vertical, while its upper portion, the remaining two-thirds its height, is inclined inwardly towards the rear as shown in Figure 1. A horizontally elongated opening 9 is made in the front wall preferably at the juncture of the vertical and inclined portions thereof for the purpose of providing what is known as the "loading" opening through which access to the interior of the oven is obtained.

This opening is controlled by means of horizontal doors 10 that slide up and down for the obvious purpose of opening or closing the opening. Suitable mechanism may of course be provided for conveniently operating these doors 10; such mechanism, however, is omitted since its construction is well understood and forms no portion of my improvements.

I have provided a suitable baking chamber within the housing above described, which chamber is of novel construction and arrangement that is especially designed for more efficiently utilizing and conserving the heat and vapors within the baking chamber of an oven. To accomplish this, a horizontal wall 12 is positioned within the oven structure intermediate the top wall 8 and the foundation that supports the structure. This horizontal wall 12 extends from side-wall to side-wall, and also extends forwardly from the rear wall towards the front wall but its forward end is spaced a suitable distance from said front wall as shown in Figure 1. The front end portion of said horizontal wall 12 is stepped downwardly to a lower plane to provide a shelf or platform 13, the purpose of which will later be explained, and below the forward edge of the platform 13 there is a relatively short vertical wall 14 extending transversely across the structure and connecting the side walls.

By reference to Figure 1 it will be seen that the wall 12 forms the floor of the horizontally disposed portion (A) of the baking chamber of the oven and said floor is in a plane which is above the horizontal plane of the lintel or top edge 11 of the loading opening 9 in the front wall. Since the horizontal wall or floor 12 extends more than half the length of the oven the major portion of the baking chamber is therefore horizontally disposed in a plane above the opening into the housing so that the hot gases, vapor, steam and the like are trapped and cannot readily escape and they are not interfered with by any draft or current of outside air that may enter through the loading opening.

The platform 13 and short transverse wall 14 provide a lateral portion (B) of the oven that is inclined slightly downward at the front end of the horizontal chamber (A) of the structure. A partition 15 extends part-way between the top and bottom of lateral oven portion (B) and is supported upon transverse angle bars 16 that have their ends secured to or imbedded in the side-walls 5.

Endless travelers or chains 17, one alongside each side-wall 5, engage with a plurality of sprockets 18 carried in pairs upon the end portions of shafts 19 that extend transversely across the oven and have their ends journaled in bearings in the side-walls.

One of the shafts is actuated by a belt or chain 20 which derives its motion from a suitable drive or motor shaft 21. At spaced locations the chains are provided with pendent hangers 22 that are located opposite each other on the respective chains and which support the usual soap-stone or other trays 23 upon which the loaves of material rest while passing through the oven and being baked.

The travelers or chains are located and operated so that the trays move upwardly in front of partition 15 past the loading opening 9 and through the lateral portion (B) of the oven chamber until they reach the top, and from thence they travel rearwardly in a horizontal plane to the rear end of the horizontal portion (A) of the oven chamber where movement in the opposite direction takes place.

Upon negotiating this opposite movement, the trays are then located slightly above the floor 12 of the oven chamber and move forwardly near the bottom of the horizontal portion (A) of the latter to a position above the platform 13 where they travel down back of partition 15 and under the lower edge thereof in the bottom of the lateral portion (B) of the oven chamber and return to their starting point at or adjacent the loading opening 9 where the finished goods are removed and replaced with other loaves of dough.

The lateral portion (B) of the oven chamber is provided with injectors 24 located above the loading opening, one in front of partition 15 and the other back of front wall 7, which injectors provide means for spraying low-pressure steam to douse the goods while said goods are entering the oven chamber, the purpose of which is to provide the dough with a moist coating which prevents premature sealing of the surface of the loaves, and also increases the relative humidity of the baking atmosphere when needed.

Heat may be supplied to the oven chamber in any suitable manner. However, I have devised a novel structure for this purpose wherein the heating units are arranged in superposed tiers, the upper tier being the hottest and located closest to the trays that are moving forwardly in the bottom of the horizontal portion (A) of the oven chamber. This structure consists of an upper row of tubes 25 and a lower row of tubes 26, said tubes being in the form of elongated pipes that are horizontally disposed above the floor 12 below the lower "run" of the traveler trays 23. The pipes or tubes are preferably parallel to each other and extend from the rear toward the front of horizontal portion A of the oven chamber where their ends communicate with and are supported by an elongated header 27 having a plurality of U-shaped passages 28 so that the tubes of the upper tier discharge into the front ends of the respective tubes of the lower tier.

The header extends transversely across the oven chamber preferably above the platform or shelf 13 upon which it is supported by a suitable frame-work 29. At their rear ends the upper tubes 25 are supported by and communicate with the interior of a transverse header or distributor box 30 into which hot gases or products of combustion are discharged from a heater or burner through suitable conduits or passageways 31. The rear ends of the lower tubes discharge into and are supported by an elongated header 32 which in turn discharges into a conduit or passageway 33 leading upwardly in the rear wall 6 to a stack or to the outside atmosphere. The upper tubes 25, which are the hottest because they receive the hot gases direct from the burner or heater, are in a horizontal plane immediately below the trays that are being moved by the traveler chains in a forward direction towards the front of the oven and thus said tubes supply heat of the highest temperature at a time during the baking period when it is most desirable to the goods.

The heater or burner, which supplies the hot gases or products of combustion to tubes for heating the oven, is shown in detail in Figure 4. The conduits or ducts 31 are spaced apart and are vertical, and communicate at their lower ends with a horizontal cross-duct 34 which in turn communicates with an elongated passageway 35 that extends forwardly to a laterally disposed portion 36.

These conduits and passageways are preferably of rectangular shape and preferably made of heat resisting and insulating material, and the lateral portion 36 is open at its outer end to receive a tubular member 37 that is co-extensive therewith and spaced therefrom. A closure 38, having a tapered aperture 39, fits the outer end of tubular member 37 and a burner nozzle 40 is positioned in said aperture so that the flame from said nozzle is discharged into the tubular member 37. The space between the member 37 and the wall of lateral passage 36 permits entrance of outside air as desired and an annular ring-like damper 41, may be adjusted towards and from the structure to regulate the quantity of outside air according to requirements.

At the top of the oven chamber, and preferably near the rear thereof, is an outlet passage 43 leading into the stack, said outlet being controlled by a damper 44 or other suitable device. By means of this controlled outlet, and the injectors adjacent the loading opening, effective means also are provided for regulating the relative humidity within the baking chamber. The heater units or tubes are so located in the oven that cold air that may seep in around the loading door may not reach these units. This is also true when the door controlling the loading opening may be opened during operation of the oven.

What I claim is:—

1. A bakery-oven comprising vertical walls and a top wall forming an elongated horizontal baking chamber, a floor terminating back of the front wall of said chamber to provide a bottom opening that affords the sole entrance to said chamber, the front wall provided with an access opening having its top below the horizontal front end of the floor, an upwardly disposed front compartment extending down from the end of the floor to a plane below the access opening, a conveyor movable upward in the front compartment past the access opening and through the bottom opening into the chamber, the conveyor also movable horizontal in the top of said chamber to the rear thereof, thence returning near the floor to the front compartment, a tier of heat supply-flues close to the returning portion of the conveyor, a tier of heat return-flues communicating with and below said supply-flues, a partition in said upwardly disposed compartment providing front and rear passageways that extend above and below the access opening and communicate with the baking chamber at the forward portion of the latter, and vapor injector means in the front passageway for spraying the goods on the conveyor moving upward therein, whereby said partition screens the goods on the other portions of the conveyor.

2. A bakery-oven comprising vertical walls and a top wall forming an elongated horizontal baking chamber, a floor terminating back of the front wall of said chamber to provide a bottom opening that affords the sole entrance to said chamber, the front wall provided with an access opening having its top below the horizontal front end of the floor, an upwardly disposed front compartment extending down from the end of the floor to a plane below the access opening, a conveyor movable upward in the front compartment past the access opening and through the bottom opening into the chamber, the conveyor also movable horizontal in the top of said chamber to the rear thereof, thence returning near the floor to the front compartment, a tier of heat supply-flues close to the returning portion of the conveyor, a tier of heat return-flues communicating with and below said supply-flues, said baking chambers being unobstructed aside from said conveyor whereby heat from said flues passes upward direct to the top run of the conveyor, a partition in said upwardly disposed compartment providing front and rear passageways that extend above and below the access opening and communicate with the baking chamber at the forward portion of the latter, and vapor injector means in the front passageway for spraying the goods on the conveyor moving upward therein, whereby said partition screens the goods on the other portions of the conveyor.

FREDERIC A. HOPPE.